(Model.)
F. B. HUNT.
PLOW.
No. 253,055.        Patented Jan. 31, 1882.
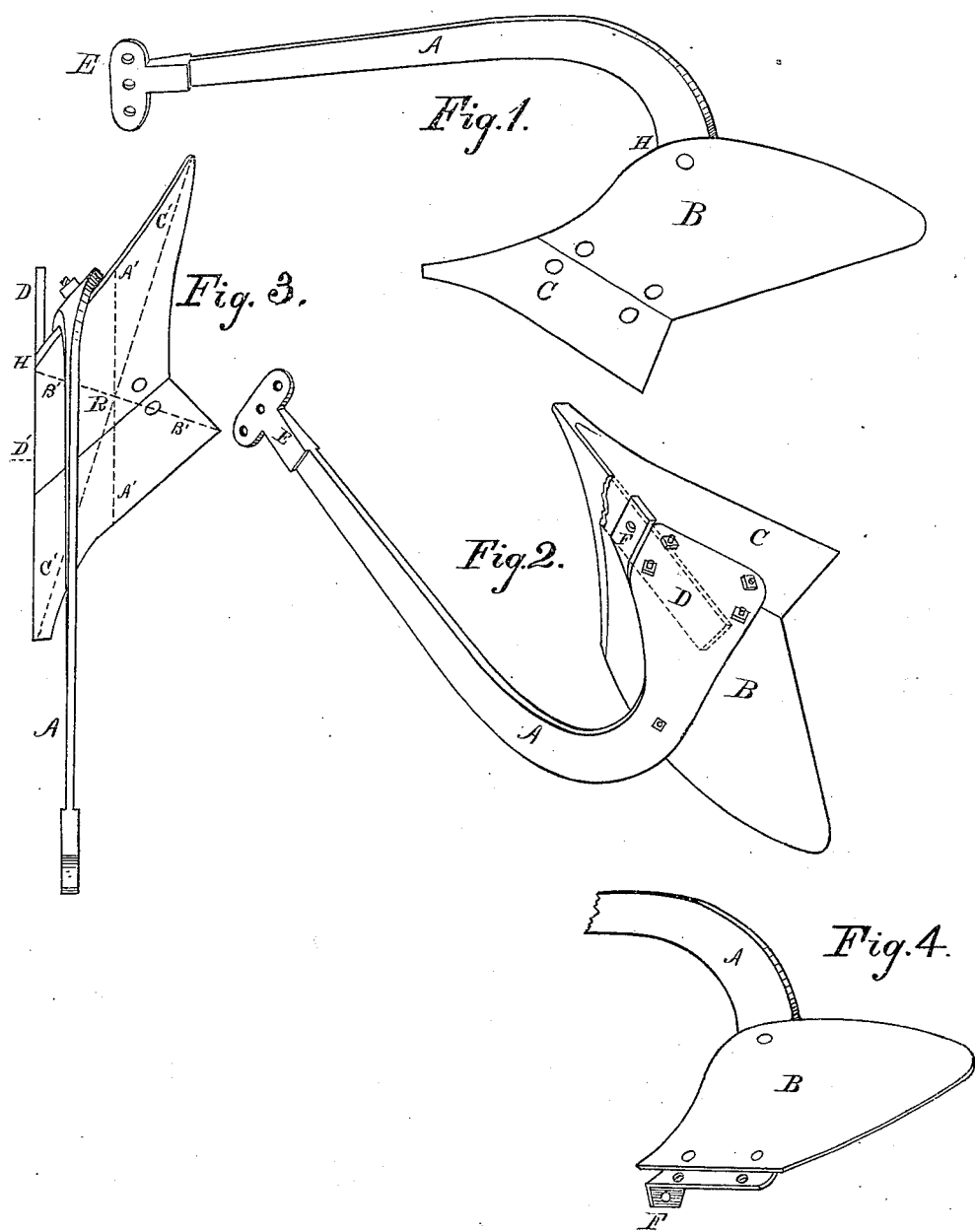
Witnesses.
Addison H. Study.
P. M. Hoisington
Inventor.
Franklin B. Hunt

UNITED STATES PATENT OFFICE.

FRANKLIN B. HUNT, OF RICHMOND, ASSIGNOR OF ONE-HALF TO D. B. ROBBINS, OF ECONOMY, INDIANA.

PLOW.

SPECIFICATION forming part of Letters Patent No. 253,055, dated January 31, 1882.

Application filed July 5, 1881. (Model.)

*To all whom it may concern:*

Be it known that I, FRANKLIN B. HUNT, of Richmond, in the county of Wayne and State of Indiana, have invented certain Improvements in Plows, of which the following is a specification.

My invention relates to a new construction of the beam of a plow and the particular mode of attaching the same to the mold-board and wing of the plowshare, as hereinafter fully set forth and described in the specification and claims.

Figure 1 is a side elevation. Fig. 2 is an inverted view, showing the shape of the beam and its attachment to the mold-board and the wing and landside of the plowshare. Fig. 3 is a top plan, showing the manner of attaching the beam within the landside of the plow. Fig. 4 shows a section of the beam with the mold-board attached and the share removed.

A is the beam of the plow. The form of the lower end of the beam and the manner of attaching the mold-board and plowshare are plainly shown in the inverted view, Fig. 2, where the front portion or lower point, F, of the beam is turned downwardly or backward parallel with the landside of the share, and is bolted thereto. The lower end of the beam is made broad and solid, and extends down beneath the wing of the plowshare, to which it is bolted. The beam and mold-board mutually support and strengthen each other, and the same is true of the share, mold-board, and beam combined, each strengthening the other. The mold-board and share are each bolted to the beam, and supported thereon entirely independent of each other, yet operate in conjunction completely. Thus it will be seen that either can be removed and replaced with great facility without disturbing the other.

It will be observed that the beam is attached in rear of and in a parallel line with the draft-center, as shown at Fig. 3, where a line, D', is shown at right angles to the center of the landside D, a line, C', from the point of the share to the heel of the mold-board, and the line B' at right angles thereto, and crossing the mold-board and share, and a parallel line, A', from a common center perpendicular to the plane of the combined mold-board and share. It will be seen that this common center falls far behind the center D' of the landside; hence the natural tendency to throw the plow from land, which creates the necessity of throwing the point of the plow outward from the beam to give the plow what is termed "land," thus, so to speak, dragging the plow sidewise to a certain extent.

It will be observed that, taking either of the lines A' or C', the portion of the share and mold-board extending outward therefrom is sufficient to balance the pressure of the landside; hence it is obvious that the real draft-center lies between the landside and the common center formed by the junction of the lines A', C', and B'.

It is a well-known fact to all practical makers and users of plows that the share and mold-board wear or cut through almost exactly in a line crossed by the beam, as shown in Fig. 3, thus showing that the greatest pressure is at that point, which is conclusive evidence that the real draft-center lies between the landside and the center formed by the dotted lines across the share and mold-board, the same always varying or shifting according to the shape and pitch of the mold-board and share.

Having thus fully described my invention, what I claim, and desire to secure by Letters Patent, is—

1. In a plow, the beam A, formed with a broad solid rear end, and bent downwardly and laterally and closely fitting the mold-board, and extending down beneath the wing of the plowshare, and bolted to the wing of the share and mold-board, respectively, and independently of each other, and having a downwardly-turned portion, F, to which the landside of the share is bolted, substantially in the manner as and for the purpose herein shown and described.

2. In a plow, the beam A, formed with a broad and solid rear end, and bent downwardly and laterally to closely fit the mold-board and share, and arranged parallel with and between the landside D and the line A', and bolted to the mold-board and wing of the share independently of each other, substantially in the manner as and for the purpose herein shown and described.

FRANKLIN B. HUNT.

Witnesses:
H. C. HUNTEMANN,
C. E. SIMMS.